(12) United States Patent
Smiddy et al.

(10) Patent No.: US 9,777,675 B2
(45) Date of Patent: *Oct. 3, 2017

(54) SYSTEM AND METHOD FOR COMBUSTING VOLATILE VAPORS

(71) Applicant: ProAct Services Corporation, Ludington, MI (US)

(72) Inventors: Gerard Willem Smiddy, Grand Rapids, MI (US); Frank Leslie Smiddy, Thompsonville, MI (US); Kyle Kirker, New Era, MI (US)

(73) Assignee: PROACT SERVICES CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 15/385,084

(22) Filed: Dec. 20, 2016

(65) Prior Publication Data

US 2017/0101964 A1    Apr. 13, 2017

Related U.S. Application Data

(63) Continuation of application No. 14/275,579, filed on May 12, 2014, now Pat. No. 9,523,330.

(Continued)

(51) Int. Cl.
*F02M 7/10* (2006.01)
*F01N 3/08* (2006.01)
(Continued)

(52) U.S. Cl.
CPC ............... *F02M 7/10* (2013.01); *F01N 3/08* (2013.01); *F02D 35/0023* (2013.01); *F02D 35/0053* (2013.01); *F02D 41/003* (2013.01); *F02M 25/08* (2013.01); *F16K 37/0041* (2013.01); *G01M 15/102* (2013.01); *F01N 2560/025* (2013.01); *F01N 2560/06* (2013.01); *F01N 2560/14* (2013.01); *F02D 2200/101* (2013.01); *H04B 1/3822* (2013.01)

(58) Field of Classification Search
CPC . F02M 13/08; F02D 35/0053; F02D 41/0021; F02D 41/003
See application file for complete search history.

(56) References Cited

U.S. PATENT DOCUMENTS

| 4,979,886 A | 12/1990 | Rippberger |
| 5,424,045 A | 6/1995 | Orman et al. |

(Continued)

*Primary Examiner* — Kevin A Lathers
(74) *Attorney, Agent, or Firm* — Belles Katz LLC

(57) ABSTRACT

A system for combusting volatile vapors includes: a carburetor having intake valves for receiving fuel from a fuel source, air from an external air intake, and volatile vapors from a vapor source, the carburetor configured to discharge a combustion mixture into a combustion engine; a plurality of sensors configured to generate sensor data based on a respective plurality of physical properties associated with the carburetor and the combustion engine; a programmable controller configured to receive the sensor data as input from each of the plurality of sensors and to control the intake valves to regulate respective ratios of the fuel, air, and the volatile vapors drawn through the carburetor in response to the received sensor data; and a display operatively coupled to the programmable controller to display at least a real-time portion of the sensor data.

20 Claims, 16 Drawing Sheets

Related U.S. Application Data

(60) Provisional application No. 61/822,151, filed on May 10, 2013.

(51) Int. Cl.

| | | |
|---|---|---|
| *F02M 25/08* | (2006.01) |
| *F02D 35/00* | (2006.01) |
| *F02D 41/00* | (2006.01) |
| *G01M 15/10* | (2006.01) |
| *F16K 37/00* | (2006.01) |
| *H04B 1/3822* | (2015.01) |

(56) References Cited

U.S. PATENT DOCUMENTS

| | | |
|---|---|---|
| 7,487,923 B2 | 2/2009 | Willsford et al. |
| 7,934,663 B2 | 5/2011 | Willsford et al. |
| 9,523,330 B2 * | 12/2016 | Smiddy .................. F02M 13/08 |
| 2006/0272500 A1 | 12/2006 | Keller et al. |

\* cited by examiner

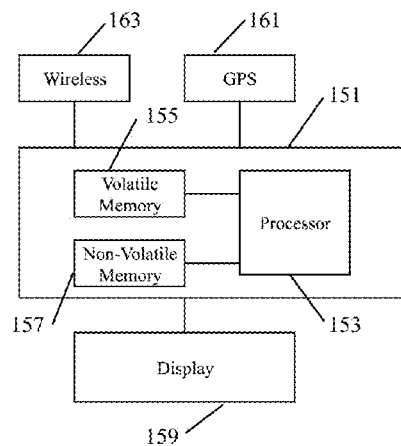

Fig. 3

- valve controllers 165, 167, 169
- valve sensors 171, 173, 175
- emergency stop switch sensor 201
- engine stop sensor 203
- engine start sensor 205
- KO tank water level sensor 207
- KO tank pressure sensor 209
- first fuel solenoid sensor 211
- second fuel solenoid sensor 213
- tachometer 215
- fuel flow meter 217
- water temperature sensor 221
- O2 pre catalytic converter sensor 223
- O2 post catalytic converter sensor 225
- oil pressure sensor 227
- external air manifold vacuum sensor 229
- pre-catalytic converter temperature sensor 231
- post-catalytic converter temperature sensor 233
- system voltage sensor 235
- lower explosive limit (LEL) sensor 237
- vapor flow meter 239
- well vacuum sensor 241
- external air flow meter 245
- door switch sensor 247
- fire system sensor 249
- tank purge sub-controller 189
- tank intake valve sub-controller 191
- tank water drain sub-controller 193
- horn sub-controller 177
- an engine ignition sub-controller 179
- first fuel solenoid sub-controller 181
- second fuel solenoid sub-controller 183
- starter solenoid sub-controller 185
- fan sub-controller 187

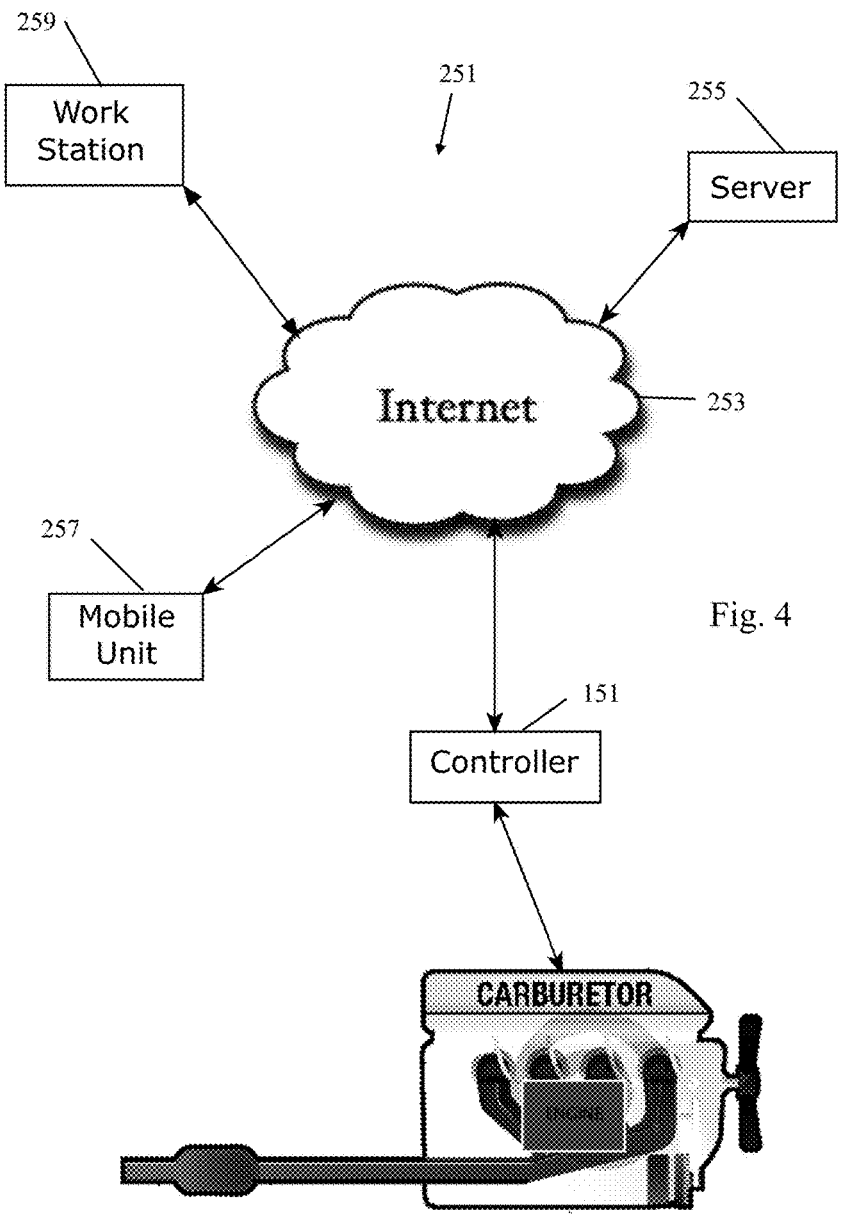

283

100-HOUR SERVICE

- Catalyst
- Muffler
- O2 Sensor
- Thermocoupler
- Gas Meter
- Fuel Solenoid
- Starter
- Alternator
- Oil PSI Sensor
- Crank Trigger
- Coil
- Ignition Box
- Well Filters
- Engine H2O Pump

- Alternator Belt
- Carb Stepper Motor
- Spark Plug Wires
- Spark Plugs
- Engine Vac Sensor
- Well Vac Sensor
- Dwyer MS 151
- TPS Sensor
- Hydraulic Temp Sensor
- Hydraulic PSI Sensor
- Engine Temp Sensor
- NOTES:

- HMI Screen
- Battery
- WEGO O2 Box
- STP 1001 Box
- CON 1002 Box
- TCB 1003 Box
- GPS 1004 Box
- IO 1005 Box

BACK

Fig. 11

SYSTEM AND METHOD FOR COMBUSTING VOLATILE VAPORS

CROSS REFERENCE TO RELATED APPLICATIONS

The present application is a continuation of U.S. patent application Ser. No. 14/275,579 filed May 12, 2014, which claims the benefit of priority to U.S. Provisional Patent Application No. 61/822,151, filed May 10, 2013; the disclosures of which are incorporated herein by reference in their entireties.

FIELD OF THE INVENTION

The field of the present invention relates to systems and processes for combusting volatile vapors that are remediated or displaced from a storage tank using a combustion engine.

BACKGROUND OF THE INVENTION

Volatile vapors, particularly in the form of hydrocarbons, may be released during soil remediation or by being displaced from a storage tank when the storage tank is otherwise filled with a liquid. One option for eliminating the recovered or displaced hydrocarbon vapors is incorporate them into a fuel or air stream for intake into an internal combustion engine, thereby incorporating the volatile vapors into the fuel/air combustion process. Such an internal combustion engine is disclosed in U.S. Pat. No. 5,424,045, the disclosure of which is incorporated herein by reference in its entirety. While burning volatile in an internal combustion engine can be an effective way of processing the volatile vapors so that they are not released into the atmosphere directly, and control systems have been developed for use with such engines to help them run efficiently, existing control systems generally present only rudimentary information to the operator in the form of very selective raw data about operation of the internal combustion engine. Existing control systems also generally provide only rudimentary scheduling and information about maintenance of the internal combustion engine. Advancements in such control systems are therefore desirable, especially where data concerning operation and maintenance are so vital to the uptime and efficient operation of the overall system.

SUMMARY OF THE INVENTION

The present invention is directed toward a system and method for combusting volatile vapors using a combustion engine, including a programmable controller for monitoring and controlling the combustion process.

In a first separate aspect of the present invention, a system for combusting volatile vapors includes a carburetor having a first intake valve for receiving fuel from a fuel source, a second intake valve for receiving external air from an external air intake, and a third intake valve for receiving volatile vapors from a vapor source, the carburetor configured to discharge a combustion mixture; a combustion engine operatively coupled to the carburetor to receive the combustion mixture into a combustion chamber; a plurality of sensors configured to generate sensor data based on a respective plurality of physical properties, wherein the plurality of sensors includes a first valve sensor operatively coupled to the first intake valve, a second valve sensor operatively coupled to the second intake valve, and a third valve sensor operatively coupled to the third intake valve, each of the valve sensors being configured to sense a valve position as one of the physical properties; a programmable controller configured to receive the sensor data as input from each of the plurality of sensors and to control the intake valves to regulate respective ratios of the fuel, the external air, and the volatile vapors taken in through the carburetor in response to the received sensor data; and a display operatively coupled to the programmable controller, wherein the programmable controller is configured to display at least a real-time portion of the sensor data on the display as the sensor data is received, the real-time portion of the sensor data including each of the valve positions.

In a second separate aspect of the present invention, a system for combusting volatile vapors includes: a carburetor having a plurality of intake valves for receiving fuel from a fuel source, external air from an external air intake, and volatile vapors from a vapor source, the carburetor configured to discharge a combustion mixture into a combustion chamber of a combustion engine; a plurality of sensors configured to generate sensor data based on a respective plurality of physical properties, wherein the plurality of sensors includes a plurality of valve sensors, each valve sensor operatively coupled to one of the intake valves and configured to sense a valve position as one of the physical properties; a programmable controller configured to receive the sensor data as input from each of the plurality of sensors and to control the intake valves to regulate respective ratios of the fuel, the external air, and the volatile vapors taken in through the carburetor and into the combustion engine in response to the received sensor data; and a display operatively coupled to the programmable controller, wherein the programmable controller is configured to display at least a real-time portion of the sensor data on the display as the sensor data is received.

In a third separate aspect of the present invention, a method for combusting volatile vapors includes: directing the volatile vapors from a vapor source into a combustion engine, wherein a carburetor, comprising a plurality of intake valves for receiving fuel from a fuel source, external air from an external air intake, and the volatile vapors, discharges a combustion mixture into a combustion chamber of the combustion engine; sensing a plurality of physical properties using a plurality of sensors configured to generate sensor data, wherein the plurality of sensors includes a plurality of valve sensors, each valve sensor operatively coupled to one of the intake valves to sense a valve position as one of the physical properties; monitoring the sensor data using a programmable controller; controlling the one or more electronically controlled valves with the programmable controller to regulate respective ratios of the fuel, the external air, and the volatile vapors drawn through the carburetor and into the combustion engine in response to the monitored sensor data; and displaying at least a real-time portion of the sensor data on the display as the sensor data is received, the real-time portion of the sensor data including each of the valve positions.

Accordingly, an improved system and method for combusting volatile vapors are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 3 is a schematic diagram of a programmable controller and associated sensors for a combustion engine;

FIG. 4 is a schematic diagram of a network incorporating a programmable controller for a combustion engine;

FIG. 11 is a screenshot showing a parts checklist page for display by a programmable controller for a combustion engine;

DETAILED DESCRIPTION OF THE INVENTION

Figure 1:
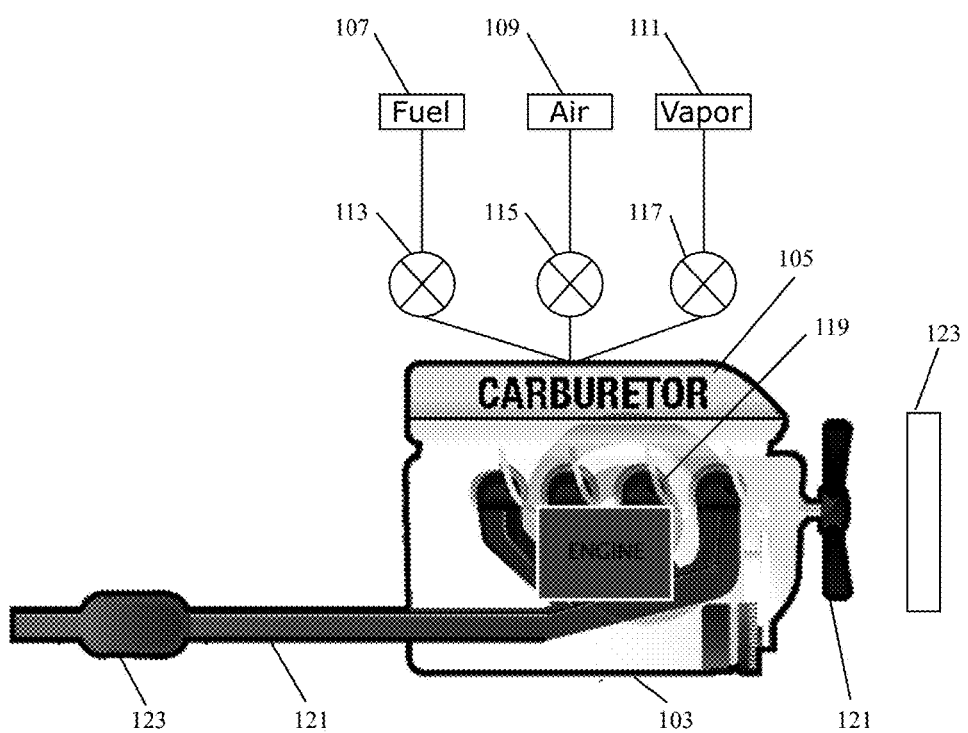
FIG. 1 is schematic diagram of a first carburetor having three valves to control air and fuel intakes.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Turning in detail to the drawings, FIG. 1 schematically illustrates a system 101 for burning volatile vapors, the system 101 including an internal combustion engine 103, the associated carburetor 105, the sources 107, 109, 111, and the intake valves 113, 115, 117 controlling the flow from each of the sources 107, 109, 111. Much of the internal combustion engine 103 operates in a manner well-known to those of skill in the art, wherein the internal combustion engine 103 receives a combustion mixture, which includes fuel, external air, and volatile vapors for the system 101, from the carburetor 105 and ignites the combustion mixture within a combustion chamber 119.

The intake valves 113, 115, 117, although shown external to the carburetor 105, may be incorporated into the carburetor 105. The first intake valve 113 controls flow of fuel from the first source 107, which is a fuel source, such as a fuel tank. The second intake valve 115 controls flow of external air from the second source 109, which is an external air source. The third intake valve 117 controls flow of volatile vapors from the third source 111, which is a volatile vapor source, which may be a tank for holding liquid hydrocarbons, or another source such as soil remediation. Each of the three intake valves 113, 115, 117 may be of different design and construction from the other valves to accommodate the type of matter being taken into the carburetor 105.

The internal combustion engine 103, like most internal combustion engines, includes a fan 121, a radiator 123, both being part of a cooling system, an exhaust 121, through which the products of combustion leave the internal combustion chamber 119, and a catalytic converter 123 is positioned inline with the exhaust 121.

Figure 2:
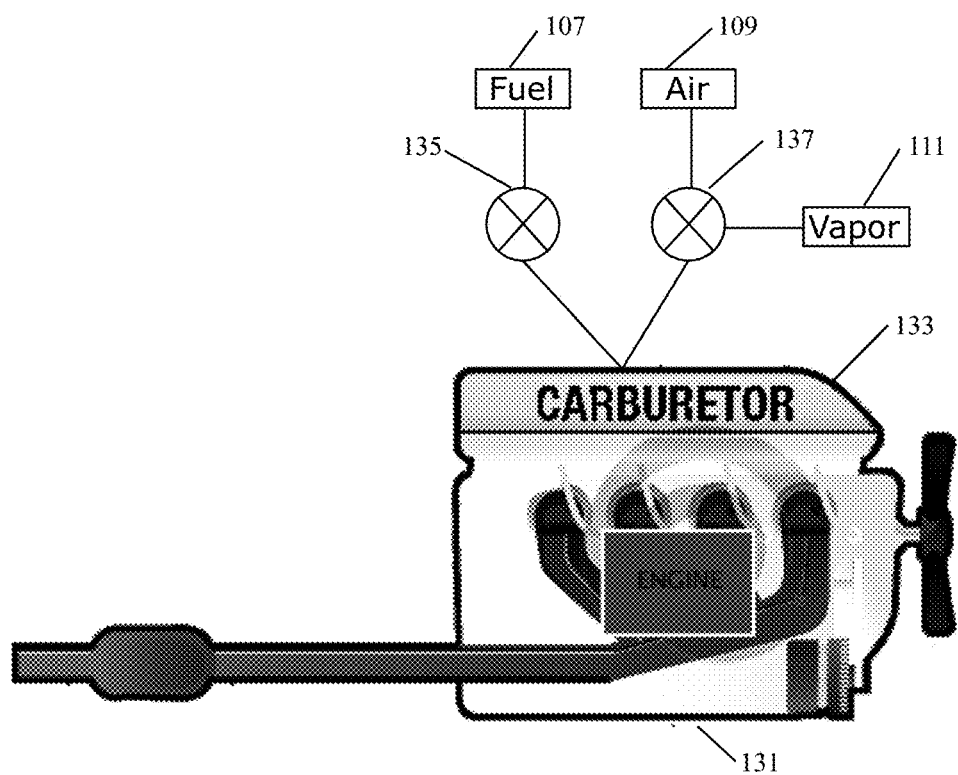
FIG. 2 is a schematic diagram of a second carburetor having two valves to control air and fuel intakes.

An internal combustion engine 131 with an alternative intake valve configuration is shown in FIG. 2. This alternative configuration includes a carburetor 133 and two intake valves 135, 137. The first intake valve 135 controls flow of fuel from the first source 107, which is a fuel source. The second intake valve 137 controls both the flow of external air from the second source 109, which is an external air source, and the flow of volatile vapors from the third source 111, which is a volatile vapor source. The second intake valve 137 combines the external air and the volatile vapors into a single stream that is drawn into the carburetor 133. As before, the intake valves 135, 137 are shown external to the carburetor 133, may be incorporated into the carburetor 105. Other configurations of the intake valves and the sources may also be used, such as having a single intake valve for controlling a combination of the fuel and the volatile vapors, among others.

A programmable controller 151 for controlling the combustion engine and managing the burning of the volatile vapors is shown in FIG. 3. The programmable controller 151 includes a programmable processor 153, a volatile memory 155, and non-volatile memory 157. The non-volatile memory 157 may be a removable memory, such as a removable hard drive, a removable SD card, and the like. Both the volatile memory 155 and the non-volatile memory 157 are used for saving sensor data received by the programmable controller 151, for storing programming, and storing operating parameters associated with operation of the internal combustion engine 131. The programmable controller 151 is communicably coupled to a display 159, a geolocation module 161, and a wireless communication module 163. The geolocation module 161 generates a geolocation signal, which identifies the geolocation of the internal combustion engine (to which the programmable controller is attached), and communicates the geolocation signal to the programmable controller 151. The wireless communication module 163 enables the programmable controller 151 to communicate wirelessly with other devices directly and/or over a wide area network. The display 159 may be a touch sensitive display for facilitating interaction with an operator. In some embodiments, the programmable controller 151 may communicate wirelessly with the display 159. In certain embodiments, the display 159 may be omitted, as the programmable processor 153 may communicate with a remote programmable unit wirelessly using the wireless communication module 163 and use a display included with the remote unit for displaying the sensor data.

The programmable controller 151 is also electronically connected to control mechanisms and sensors which enable the programmable controller 151, and an operator, to monitor and control operation of the internal combustion engine for burning the volatile vapors. The various sensors are positioned in and around the system and configured to generate sensor data based on monitored physical properties associated with the system. The sensor data generated by each sensor is communicated to the programmable controller, whether in raw form or following processing of raw sensor data by a sub-controller (such as an analog-to-digital converter) to generate a representation of the sensor data. The measured physical properties may vary, and the type of sensor employed depends upon the type of physical property being monitored.

The programmable controller 151 is communicably coupled to three valve sub-controllers 165, 167, 169, each of which is coupled to one of the three intake valves, respectively, for variably controlling the position of the respective intake valve by applying a voltage within an operational range of voltages for each respective valve sub-controller. Additionally, the programmable controller 151 is able to sense the voltage being applied to each of the valve sub-controllers. Any one or more of the valve sub-controllers 165, 167, 169 may be incorporated into the programmable controller 151, or any one or all of the valve sub-controllers 165, 167, 169 may be housed and located separately from the programmable controller 151. The programmable controller 151 is also communicably coupled to three valve sensors 171, 173, 175, each of which is positioned near one of the three intake valves, respectively, so that the programmable controller 151 may sense, through the three valve sensors 171, 173, 175, the position of each of the three intake valves. The three valve sensors 171, 173, 175 may communicate an analog signal to the programmable controller 151, or alternatively, the analog signal from one or more of the three valve sensors 171, 173, 175 may be converted into a digital signal by an appropriate analog-to-digital converter, with the resulting digital signal being communicated to the programmable controller 151.

The programmable controller 151 is communicably coupled to additional sub-controllers associated with the internal combustion engine, any of which may be incorporated into the programmable controller 151: a horn sub-controller 177; an engine ignition sub-controller 179; a first fuel solenoid sub-controller 181; a second fuel solenoid sub-controller 183; a starter solenoid sub-controller 185; and an external air manifold sub-controller 187. These sub-controllers, including the valve sub-controllers 165, 167, 169, enable the programmable controller 151 to exert control over nearly all operational aspects of the internal combustion engine. Where desired, for a particular sub-controller, the programmable controller 151 may apply a variable actuating signal, and the programmable controller 151 may be configured to sense the voltage (or current) being applied to any of the sub-controllers.

The horn sub-controller 177 enables the programmable controller 151 to have control over a horn (not shown) associated with the internal combustion engine, with the horn serving to provide a localized audible alert signal. The engine ignition sub-controller 179 enables the programmable controller 151 to have start and stop control for the internal combustion engine. The first fuel solenoid sub-controller 181 and the second fuel solenoid sub-controller 183 enables the programmable controller 151 to actuate two fuel solenoids (not shown), so that the programmable controller 151 may shut off the flow of fuel from the fuel source. The starter solenoid sub-controller 185 enables the programmable controller 151 to have actuating control over the starter (not shown) for the internal combustion engine. The combination of the engine ignition sub-controller 179 and the starter solenoid sub-controller 185 provide the programmable controller with the ability to control the start-up process for the internal combustion engine. The external air manifold sub-controller 187 enables the programmable controller 151 to variably control the rate at which external air is drawn into the system, the external air being directed to the air intake valve.

The programmable controller 151 is also communicably coupled to sub-controllers associated with a vapor source, and where the vapor source is a tank (commonly called a "knockout tank" or "KO tank", or more generally, the "well") these sub-controllers include: a tank purge sub-controller 189; a tank intake valve sub-controller 191; and a tank water drain sub-controller 193. The tank purge controller 189 enables the programmable sub-controller 151 to actuate a tank purge valve (not shown). The tank intake valve sub-controller 191 enables the programmable controller 151 to actuate a tank intake valve (not shown). The tank water drain sub-controller 193 enables the programmable controller 151 to actuate a tank water drain valve (not shown). These sub-controllers enable the programmable controller 151 to exert control over important operational aspects of a knockout tank. Where desired, for a particular tank sub-controller, the programmable controller 151 may apply a variable actuating signal, and the programmable controller 151 may be configured to sense the voltage (or current) being applied to any of the tank sub-controllers.

The programmable controller 151 is communicably coupled to and receives digital signal input from the following sensors: an emergency stop switch sensor 201; an engine stop sensor 203; an engine start sensor 205; a KO tank water level sensor 207; a KO tank pressure sensor 209; a first fuel solenoid sensor 211; a second fuel solenoid sensor 213; a tachometer 215; and a fuel flow meter 217. The programmable controller 151 is communicably coupled to and receives analog signal input from the following sensors: a water temperature sensor 221; an $O_2$ pre catalytic converter sensor 223; an $O_2$ post catalytic converter sensor 225;

an oil pressure sensor 227; an external air manifold vacuum sensor 229; a pre catalytic converter temperature sensor 231; a post catalytic converter temperature sensor 233; a system voltage sensor 235; an lower explosive limit (LEL) sensor 237; a vapor flow meter 239; a well vacuum sensor 241; an external air flow meter 245; a door switch sensor 247; and a fire system sensor 249. The analog signal from any one or more of the included analog sensors may be converted into a digital signal by an appropriate analog-to-digital converter, with the resulting digital signal being communicated to the programmable controller 151.

The emergency stop switch sensor 201 enables the programmable controller 151 to monitor an emergency stop switch (not shown), so that when the emergency stop switch is actuated by an operator, the programmable controller 151 takes all programmed actions for an emergency shut down of the internal combustion engine. The engine stop switch may be an analog switch, which outputs a digital signal, or a digital switch that is represented on the display. The engine stop sensor 203 enables the programmable controller 151 to monitor an engine stop switch (not shown), so that when the engine stop switch is actuated, the programmable controller 151 takes all programmed actions for an orderly shut down of the internal combustion engine. The engine start sensor 205 enables the programmable controller 151 to monitor an engine start switch (not shown), so that when the engine start switch is actuated, the programmable controller 151 takes all programmed actions for an orderly start up of the internal combustion engine. Either or both of the engine stop switch and the engine start switch may be an analog switch, which outputs a digital signal, or a digital switch which is represented on the display.

The KO tank water level sensor 207 enables the programmable controller 151 to monitor a water level within the KO tank. The KO tank pressure sensor 209 enables the programmable controller 151 to monitor a pressure within the KO tank. The well vacuum sensor 241 enables the programmable controller 151 to monitor a vacuum state of the KO tank. The vapor flow meter 239 enables the programmable controller 151 to monitor a flow of volatile vapors from the KO tank.

The first fuel solenoid sensor 211 enables the programmable controller 151 to monitor the position of the first fuel solenoid, and the second fuel solenoid sensor 213 enables the programmable controller 151 to monitor the position of the second fuel solenoid. The fuel flow meter 217 enables the programmable controller 151 to monitor a the flow of fuel, such as propane, from the fuel source to the carburetor. The programmable controller 151 may be programmed to convert the signal received from the fuel flow meter 217 into cubic feet per minute (CFM). The external air flow meter 245 enables the programmable controller 151 to monitor the flow of external air from the external air source (e.g., the external air manifold) to the carburetor. The programmable controller 151 may be programmed to convert the signal received from the external air flow meter 217 into CFM.

The tachometer 215 enables the programmable controller 151 to monitor the rotation rate of the internal combustion engine, thereby measuring the revolutions per minute (RPM). The oil pressure sensor 227 enables the programmable controller 151 to monitor an oil pressure of the internal combustion engine. The external air manifold vacuum sensor 229 enables the programmable controller 151 to monitor the vacuum pressure of the internal external air intake. The water temperature sensor 221 enables the programmable controller 151 to monitor the temperature of water within the cooling system of the internal combustion engine. The $O_2$ pre catalytic converter sensor 223 enables the programmable controller 151 to monitor the oxygen level in the exhaust from the internal combustion engine prior to the exhaust passing through the catalytic converter, and likewise, the pre catalytic converter temperature sensor 231 enables the programmable controller 151 to monitor the temperature of the exhaust from the internal combustion engine prior to the exhaust passing through the catalytic converter. Similarly, the $O_2$ post catalytic converter sensor 225 enables the programmable controller 151 to monitor the oxygen level in the exhaust from the internal combustion engine after the exhaust has passed through the catalytic converter, and the post catalytic converter temperature sensor 233 enables the programmable controller 151 to monitor the temperature of the exhaust from the internal combustion engine after the exhaust has passed through the catalytic converter.

The system voltage sensor 235 enables the programmable controller 151 to monitor the operating voltage supplied to the programmable controller 151. The LEL sensor 237 enables the programmable controller 151 to monitor the levels combustible vapors (from the KO tank, the fuel source, or elsewhere) accumulated within the interior of an engine enclosure housing the internal combustion engine. Sufficiently high levels of such combustible vapors will trigger the programmable controller 151 to initiate an appropriate shut down procedure. The door switch sensor 247 enables the programmable controller 151 to monitor whether an access door for the engine enclosure is open or closed. The fire system sensor 249 enables the programmable controller 151 to monitor a fire suppression system included within engine enclosure. Activation of the fire suppression system will trigger the programmable controller 151 to initiate an appropriate shut down procedure.

The programmable controller 151 is shown as part of a system 251 in a network environment in FIG. 4. The network environment may include and operate over a wide area network, which may be public network such as the Internet 253. Alternatively, the wide area network may be a private network or any combination of public and private networks. The networks themselves may be wired networks, wireless networks, or any combination of wired and wireless networks. Using the network, the programmable controller 151 may communicate with any of a server 255, a remote programmable unit 257, and a remote workstation 259. Login identifiers and passwords may be established for operators to better secure access to the programmable controller 151 from unwanted network intrusions when the network used is at least partially public. The remote programmable unit 257 may be any of a smart phone, a tablet computer, a laptop computer, and the like. The remote workstation 259 may be a desktop computer or other similar device. In the system 251, only one of each type of device is shown for simplicity, while those of skill in the art will recognize that any number of remote programmable units, workstations, servers, and programmable controllers may be included as part of the overall system.

The programmable controller 151 may communicate sensor data to any of the server 255, the remote programmable unit 257, and the remote workstation 259, and the programmable controller 151 may receive control data from any of the server 255, the remote programmable unit 257, and the remote workstation 259. The remote programmable unit 257 and the remote workstation 259 may be programmed with the same interactive programming described herein for the programmable controller 151, so that an operator of the remote programmable unit 257 and the remote workstation 259 may interact with the programmable controller 151, along with the sensors and sub-controllers with which the programmable controller 151 communicates, in the same manner as if the operator was using a display, as shown in FIG. 3, to interact with the programmable controller 151. When interacting and communicating with the programmable controller 151, the remote programmable unit 257 and the remote workstation 259 receives sensor data from the programmable controller 151 and may send control data to the programmable controller 151. The control data sent to the programmable controller is the same type of settings and parameters data that may be entered by an operator directly on a display connected to the programmable controller, as shown in FIG. 3 and discussed in greater detail below.

As another feature, the programmable controller 151 may communicate with the server 255 establish a database in which the sensor data may be saved for future reference and analysis. Once the database is established by the server 255, according to instructions provided by the programmable controller 151, the programmable controller 151 communicates sensor data to the server 255, and the server 255 appends the received sensor data to the database. The database may take any form or format desired, and may be in the form of an SQL database.

Figure 5:
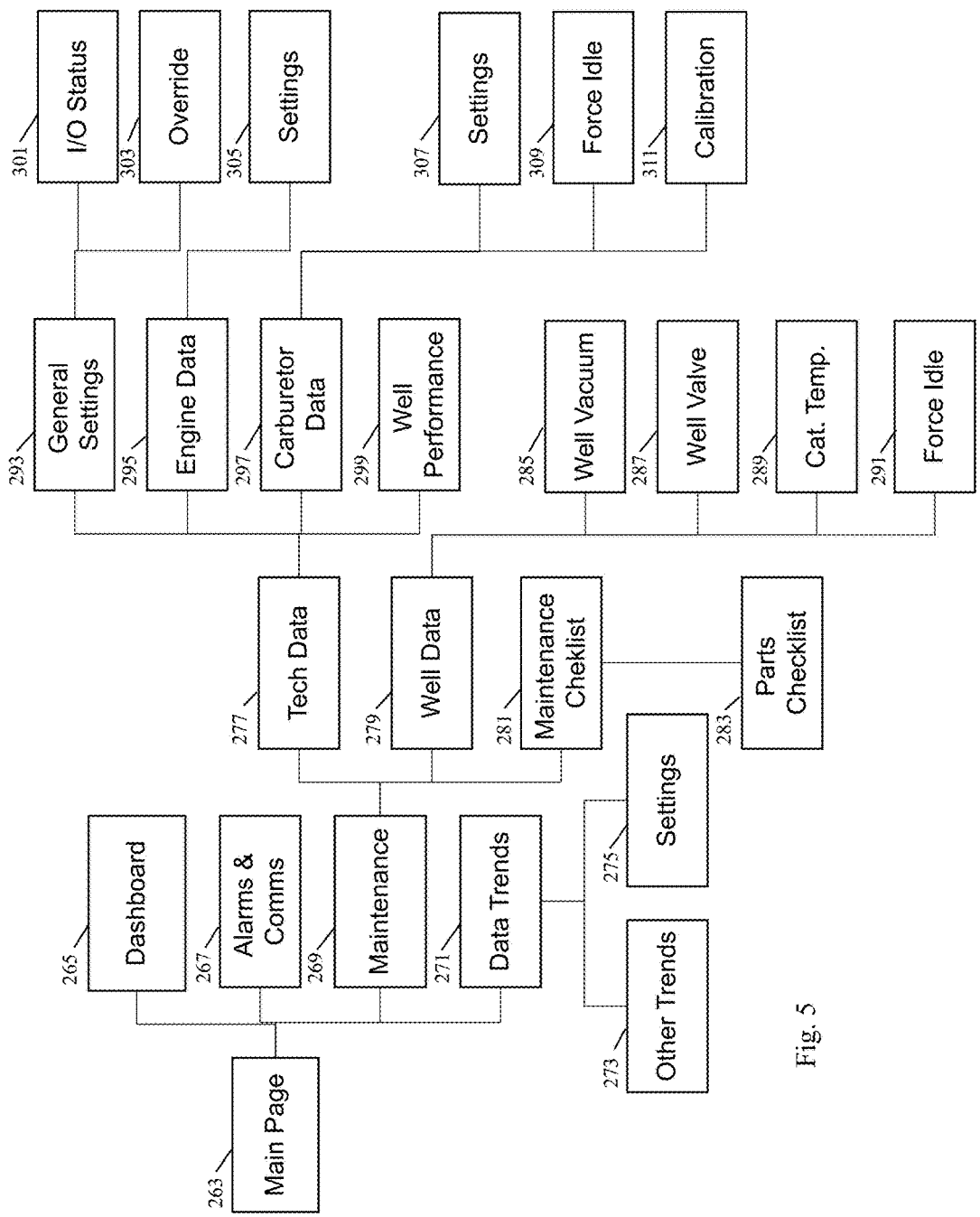
FIG. 5 is a diagram showing a hierarchical structure of pages for display by a programmable controller for a combustion engine.

A hierarchical structure of pages 261 for display by the programmable controller on the display is shown in FIG. 5. Navigation between the different pages may be achieved by employing a touch-sensitive display and providing active regions, identified by graphical objects, on the touch-sensitive display for the operator to move through the hierarchical structure of pages 261. A navigation area may be represented by a panel on the display which enable the operator to traverse up and down the hierarchy. In addition, a graphical object may be an active region and leads to a page which enables the operator to input parameters associated with the feature represented by the graphical object and/or leads to a page where further information about the feature represented by the graphical object.

When the operator is presented with a page on which parameters may be entered or changed, an appropriate numerical or alphabetical virtual key pad is shown on the display. When an operator wants to make a change to an adjustable parameter, an allowable range for adjusting the parameter is shown on the display. If the operator attempts to adjust the parameter out of the given range, a message indicating that the entered parameter is out of the allowed range is shown on the display.

The home page 263 of the hierarchical structure of pages 261 is the default page that is shown when the programmable controller is initially accessed by an operator. The home page 263 shows the time, date, and total run hours for the internal combustion engine. The home page 263 may also include additional information, such as a job number, a unit number, and a serial number for the internal combustion engine. At least part of the home page 263 shows the current operational status by changing background colors. When the background is a first color, such as white, it signifies the system is in idle mode and all sensor data indicates that there are no issues that need to be addressed by the operator. When the background color is a second color, such as green, it signifies that the internal combustion engine is in production mode and there are no issues that need to be addressed by the operator. When the background is a third color, such as red, it signifies that an alarm or warning has been triggered and attention is needed by the operator. In certain embodiments, an operator may need to enter an identifier and/or a password prior to navigating beyond the home page 263. In addition, operators may be assigned a tech level, with at least two levels being assignable. The lower tech level, referred to as "tech level 1," may have limited access to certain parts of the programmable controller, and the higher tech level, referred to as "tech level 2," has full access to the programmable controller.

From the home page 263, the operator may navigate to a dashboard page 265, an alarms and communications page 267, a maintenance page 269, and a data trends page 271. The data trends page 271 leads to a additional data trends pages 273 and to a trends settings page 275. The maintenance page 269 leads to a tech page 277, a well data page 279, and a service checklist page 281. The service checklist page 281 leads to a parts checklist page 283. The well data page 279 leads to a well vacuum settings page 285, a well valve settings page 287, a catalytic converter temperature settings page 289, and to a force idle page 291. The tech page 277 leads to a general settings page 293, an engine data page 295, a carburetor data page 297, and a well performance page 299. The general settings page 293 leads to an input/output status page 301 and an override page 303, and the engine page 295 leads to an engine settings page 305. The carburetor page 297 leads to a carburetor settings page 307, a force idle page 309, and a carburetor calibration page 311.

Figure 6:
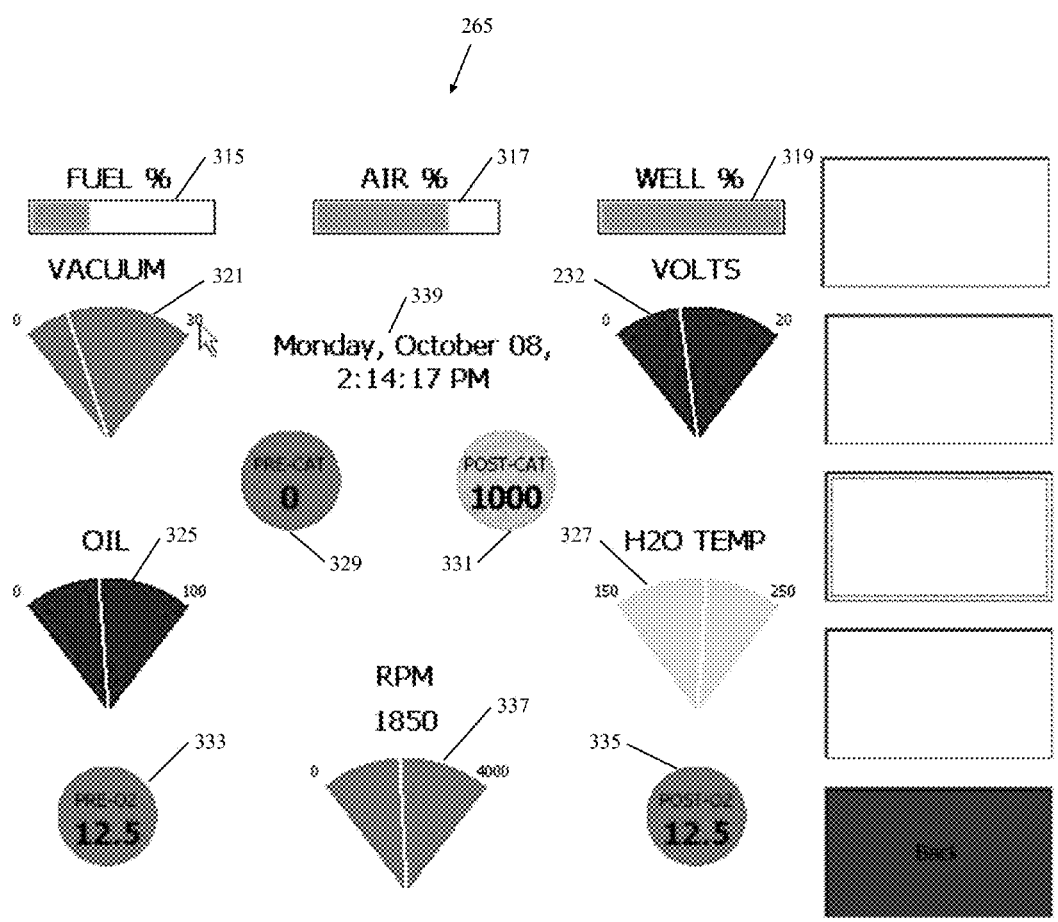
FIG. 6 is a screenshot showing a dashboard page for display by a programmable controller for a combustion engine.

An exemplary dashboard page 265 is shown in FIG. 6. The dashboard page 265 is a summary page which shows real time performance and status data associated with the overall system. In an exemplary embodiment, the dashboard page 265 shows: the amount the fuel intake valve for the carburetor is open 315, as a percentage open; the amount the external air intake valve for the carburetor is open 317, as a percentage open; the amount the volatile vapor intake valve for the carburetor is open 319, as a percentage open; the external air manifold vacuum level 321, the system operating voltage 323, the engine oil pressure 325, the engine water temperature 327, the pre-catalytic converter exhaust temperature 329, the post-catalytic converter exhaust temperature 331, the pre-catalytic converter exhaust $O_2$ level 333, the post-catalytic converter exhaust $O_2$ level 335, the engine RPM 337, and the current date and time 339. When the data displayed is associated with a maximum or minimum range entered by the operator, the dashboard page 265 will show the graphical representation of the data in a first color, such as green, when the particular real-time sensor data is within the set range, and it will show the graphical representation of the data in a second color, such as red, when the particular real-time sensor data is outside of the set range. Other types of data may be included on the dashboard page 265 based on design choice.

Figure 7:
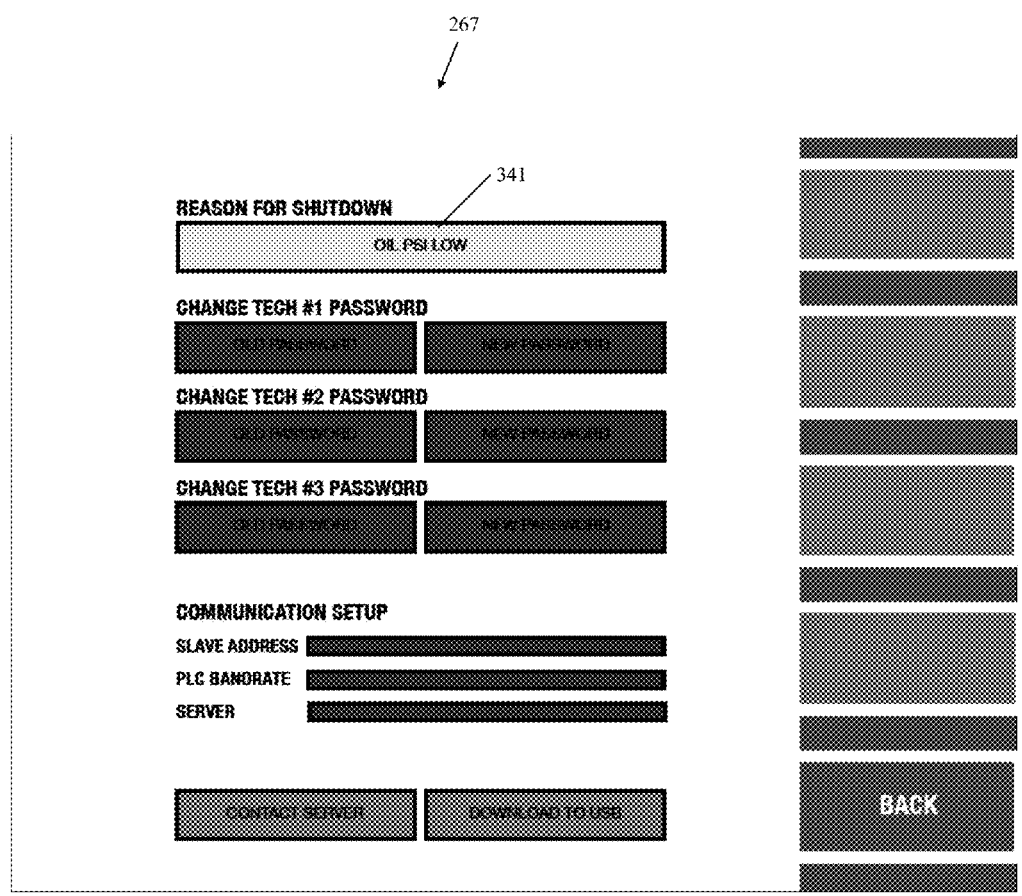
FIG. 7 is a screenshot showing an alarms and communications page for display by a programmable controller for a combustion engine.

An exemplary alarms and communications page 267 is shown in FIG. 7. The alarms and communications page 267 shows a list of active faults and alarms 341 in a prominent position near the top of the page, with the alarms listed in chronological order. Alarms remain in the list until cleared by the operator, with an active region being provided for the operator to clear an alarm. The alarms and communications page 267 also enables passwords to be set for operators, and it provides the operator with configuration access for establishing communications with a server, including set-up and management of the database once communications with the server are established. The alarm and communications page 267 may also give the operator an option to download all stored data into a non-volatile memory via a USB port that may be included with the programmable controller.

Figure 8:
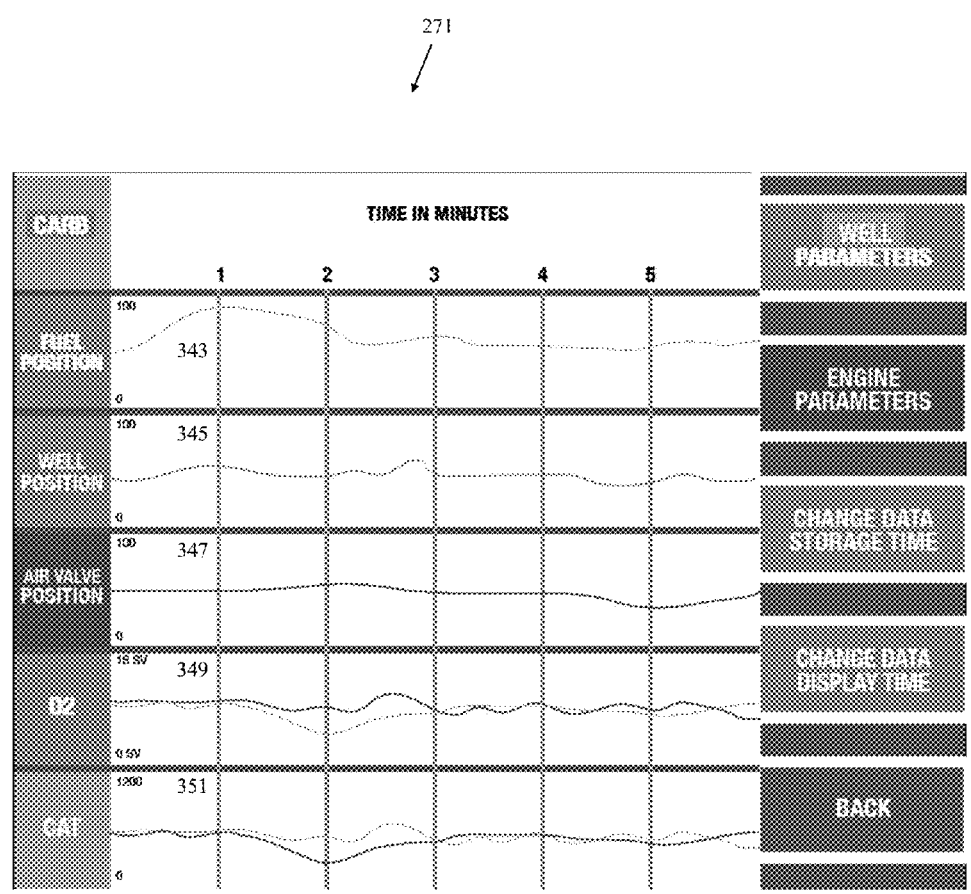
FIG. 8 is a screenshot showing a data trends page for display by a programmable controller for a combustion engine.

An exemplary data trends page 271 is shown in FIG. 8. The data trends page 271 shows the real-time and historical sensor data for a select number of the sensors in a graph format. For example, the trends data page 271 may show the real-time sensor data along with six minutes of historical data. Carburetor trend sensor data is shown in FIG. 8, and this data includes the position of the three intake valves 343, 345, 347, along with the pre- and post-catalytic converter exhaust $O_2$ levels 349 (two lines shown on a single graph) and the pre- and post-catalytic converter exhaust temperatures 351 (two lines shown on a single graph). Active regions are included so that the operator may switch to trends associated with the internal combustion engine and with the well by selecting. Sensor data that may be shown with the engine trend sensor data includes engine oil temperature, engine water temperature, external air manifold vacuum, and pre- and post-catalytic converter exhaust $O_2$ levels, and pre- and post-catalytic converter exhaust temperatures. Sensor data that may be shown with the well trend sensor data includes the CFM intake from the well, the parts per million (PPM) of hydrocarbons in the well intake, the calculated BTU's of the hydrocarbons burned by the internal combustion engine, the well vacuum pressure, and the external air manifold vacuum pressure. Other sensor data may be included in any of the trend pages. The amount of historical sensor data displayed may be set by the user, as is the amount of historical data stored by the programmable controller. Both these parameters may be set in the trends settings page 275 by the operator entering the desired values for each parameter.

The trends data can be valuable when performing maintenance on the system. For example, the operator may be able to tell from the trends data if the engine performance has changed gradually over time, resulting in an alarm being triggered from the sensor data associated with one of the sensors going beyond the maximum or minimum preset values, or if the sensor data has become erratic, thereby exceeding one of the preset values and being indicative of a failing sensor. In each instance, the action taken by the operator to perform maintenance will be significantly different. In the former case, the operator may need to perform an overall service of the internal combustion engine, and in the latter case, the operator may need to do nothing more than replace the failing sensor.

Figure 9:
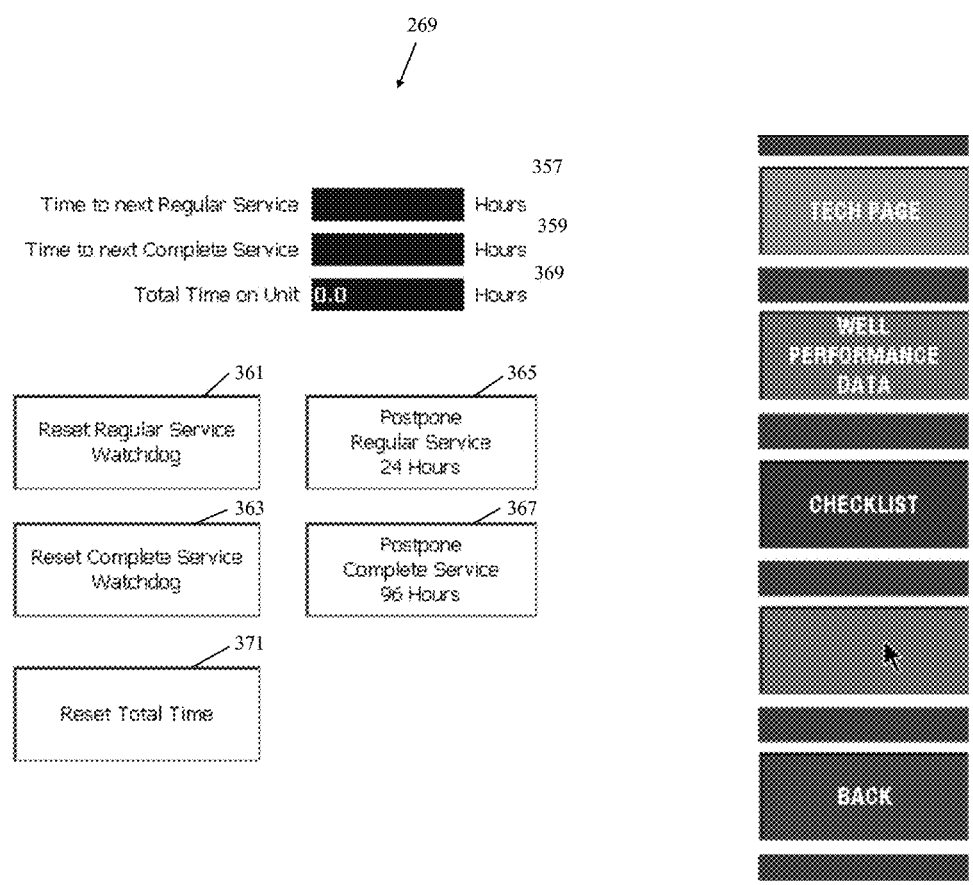
FIG. 9 is a screenshot showing a maintenance page for display by a programmable controller for a combustion engine.

An exemplary maintenance page 269 is shown in FIG. 9. The maintenance page 269 shows two different countdown timers 357, 359, with the first countdown timer 357 counting down the time until the next 100-hour general service of the internal combustion engine, and the second countdown timer 359 counting down the time until the next 1000-hour general service of the internal combustion engine. Each countdown timer 357, 359 shows remaining time until the next service interval and the appropriate reset and delay options. A reset button 361, 363 and a delay button 365, 367 are included for each countdown timer 357, 359. The reset buttons 361, 363 reset the respective timers, while the delay buttons 365, 367 serve to postpone the alarm associated with each countdown timer 357, 359. Preferably, each countdown timer 357, 359 may only be postponed for a limited time before a fault is entered that can only be cleared by performing the designated maintenance. The total operating time of the internal combustion engine 369 is also displayed and tracked, and a button is provided to reset the total operating time 371.

The programmable controller also tracks certain events associated with maintenance of the system. The tracked items may include: when the regular service countdown timer is reset; when the regular service fault is postponed; when the complete service countdown timer is reset; when the complete service fault is postponed; when the total time on the unit is reset; when the regular service countdown timer expires; and when the complete service countdown timer expires.

Figure 10:
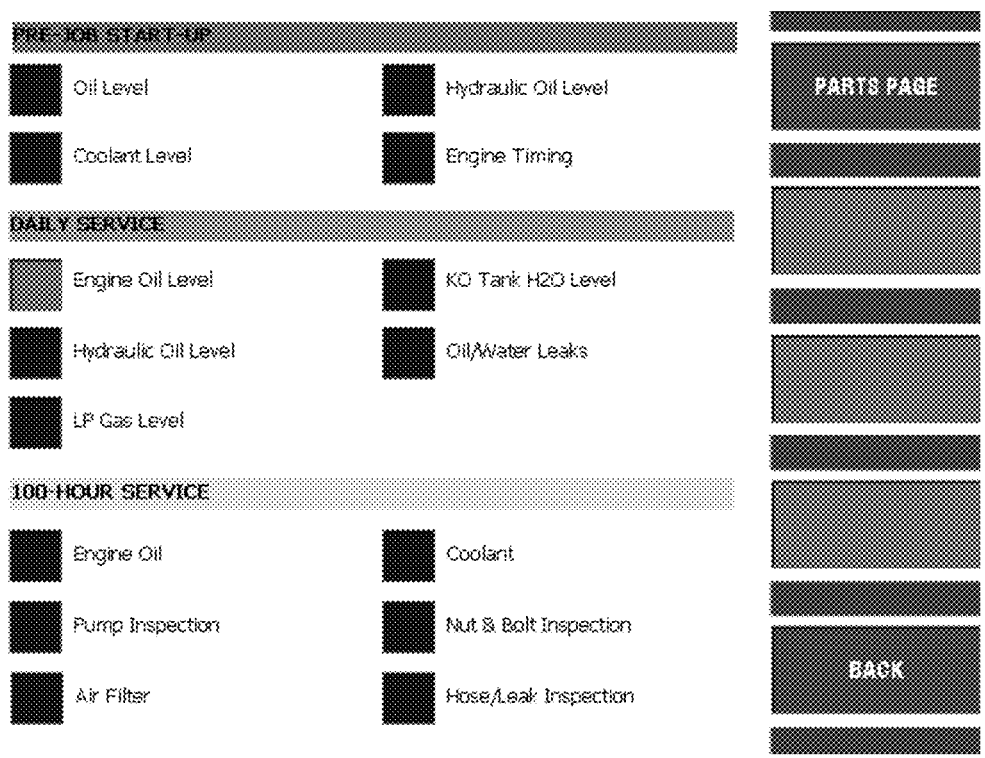
FIG. 10 is a screenshot showing a service checklist page for display by a programmable controller for a combustion engine.

An exemplary service checklist page 281 is shown in FIG. 10. This page enables an operator to check a service item to indicate that the service has been performed. When an item changes status from un-checked to checked (i.e., not yet serviced to serviced), the programmable controller tracks the event when the operator leaves the service checklist page 281. An exemplary parts checklist page 283 is shown in FIG. 11. This page enables an operator to check a parts item to indicate that the part has been serviced (e.g., the required maintenance on that part has been performed, or the part has been replaced). When an item changes status from un-checked to checked (i.e., not yet serviced to serviced), the programmable controller tracks the event when the operator leaves the service checklist page 281 (not when the operator leaves the parts checklist page 283). The parts checklist page may apply to individual parts of the internal combustion engine, or it may apply to sub-systems of the engine. The types of service items and parts items included on each of the service checklist page 281 and the parts checklist page 283 may vary based upon design choice.

Figure 12:
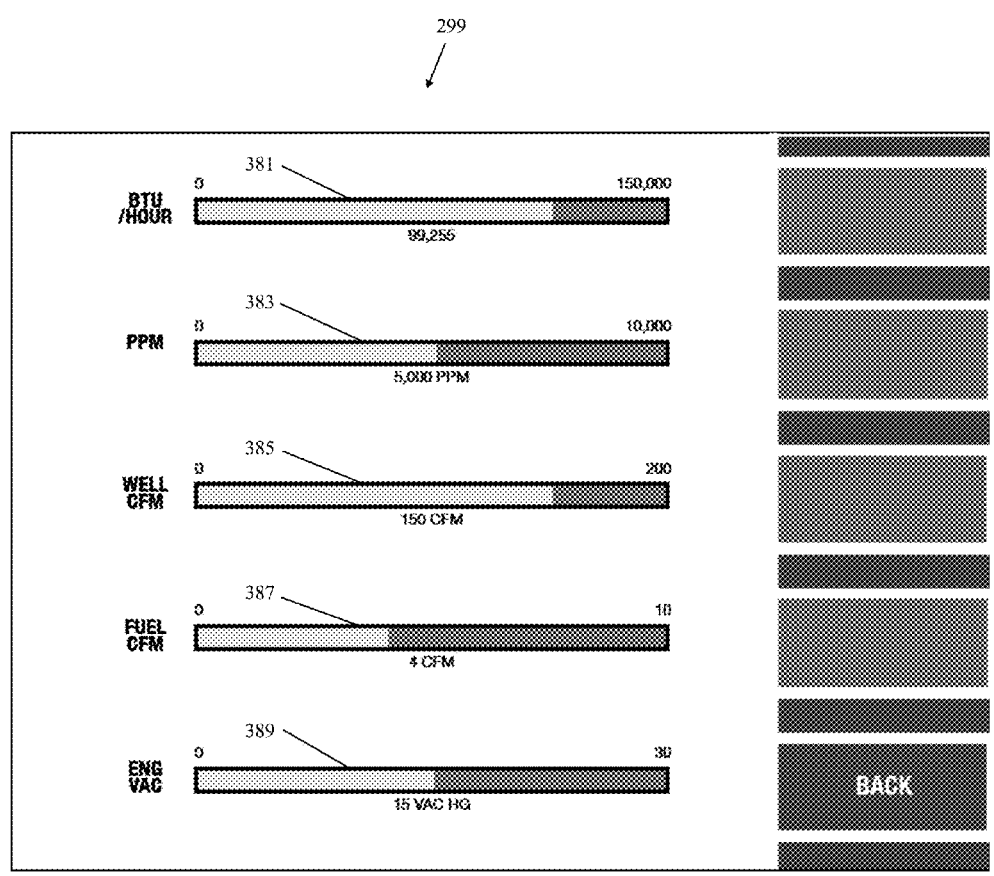
FIG. 12 is a screenshot showing a well performance page for display by a programmable controller for a combustion engine.

An exemplary well performance page 299 is shown in FIG. 12. The well performance page 299 serves as a quick reference to data associated with the well or data that is associated with the burn rate of the volatile vapors from the well. As shown, the well performance page 299 includes simple graphs showing the calculated BTUs per hour 381 generated by burning the volatile vapors from the well; the parts per million of hydrocarbons 383 included in the volatile vapors from the well; the CFM of volatile vapors 385 from the well; the CFM of fuel from the fuel source 387; and the external air manifold vacuum level 389. Other data may be included as desired on the well performance page 299.

Figure 13:
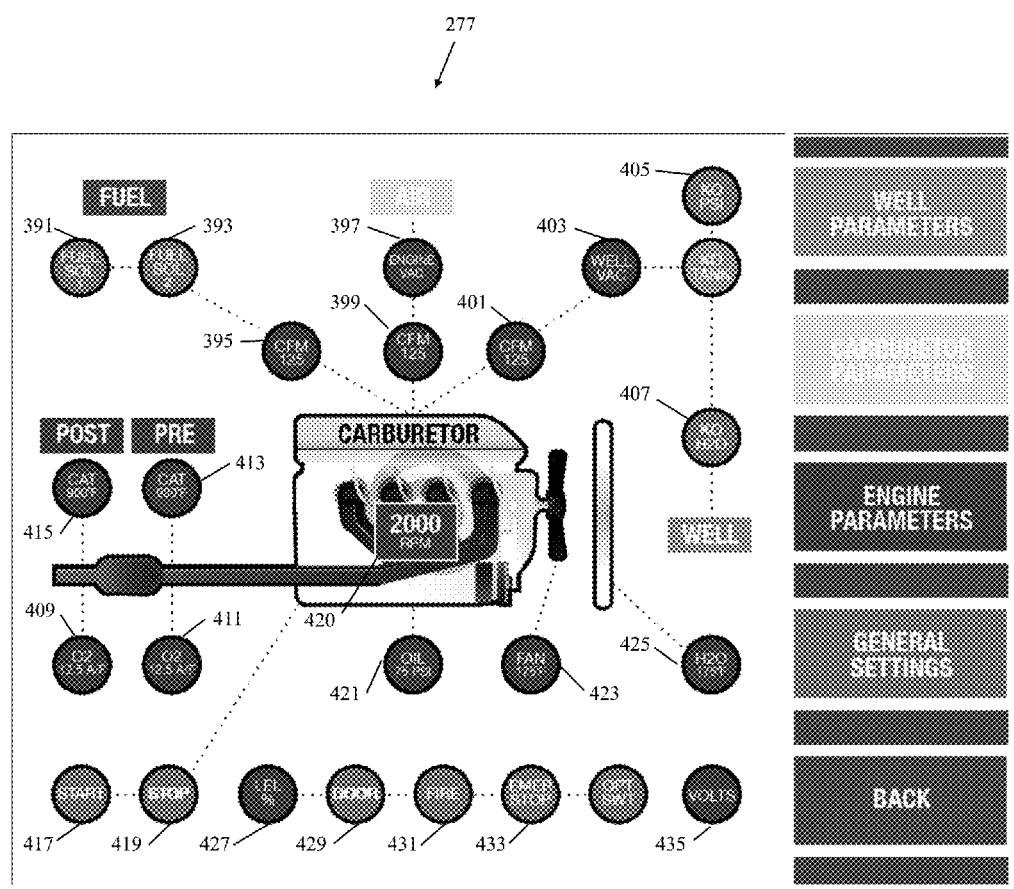
FIG. 13 is a screenshot showing a system technician data page for display by a programmable controller for a combustion engine.

An exemplary tech data page 277 is shown in FIG. 13. The tech data page 277 gives real time readings of the fuel system, engine, and well conditions. In addition, there may be two versions of the tech data page 277, with both having the same appearance, and the difference being that on one tech page the operator is limited in the changes that can be made to the parameters shown, and in the other tech page the operator may change the parameters without limit. The difference is determined by tech level assigned to the operator logging into the programmable controller. Tech level 1 operators may be limited to changing a performance parameter by no more than 25% of that value for the performance parameter as set by a tech level 2 operator. Other restrictions may be applied to tech level 1 operators, as desired.

The tech data page 277 includes the following real-time sensor data and color indicators showing whether the sensor data displayed is within a desired operating range: the status of the first fuel solenoid 391 (off or on); the status of the second fuel solenoid 393 (off or on); the fuel flow rate 395; the external air manifold vacuum 397; the external air flow rate 399; the volatile vapor flow rate 401 from the well; the well vacuum 403; the KO tank purge valve status 405; the KO tank water drain valve status 407; the pre- and post-catalytic converter exhaust $O_2$ levels 409, 411; the pre- and post-catalytic converter exhaust temperatures 413, 415; the engine start switch status 417; the engine stop switch status 419; the engine RPM 420; the engine oil pressure 421; the engine fan status 423; the engine water temperature 425; the LEL percentage 427 in the engine enclosure; the engine enclosure door status 429; the fire suppression system status 431; the emergency engine stop status 433; and the system voltage 435. For certain of the sensor data displayed, it is also desirable to include a third color indicator to visually show when the sensor data has passed a predetermined warning limit, this warning limit being outside of the desired operating range. The sensors for which it may be desirable to have this third color indicator include at least all engine exhaust sensors, the well flow rate and well vacuum sensors, all external air-related sensors, and all fuel-related sensors.

Each graphical object of the various sensor data shown on the tech data page 277 is an active region and leads to a page which enables the operator to input parameters associated each respective sensor. The parameters may serve to establish a predetermined limit, which may be an upper, a lower, or both, for the associated sensor. In the event that the predetermined limit is reached during operation, the programmable controller will take a predetermined action, also identified by the operator, which may include one or more of setting a fault alert, communicating the alert with a server, a remote unit, and/or a workstation, sounding an audible alert with the horn, and shutting down operation of the internal combustion engine, among other possible actions.

Figure 14:
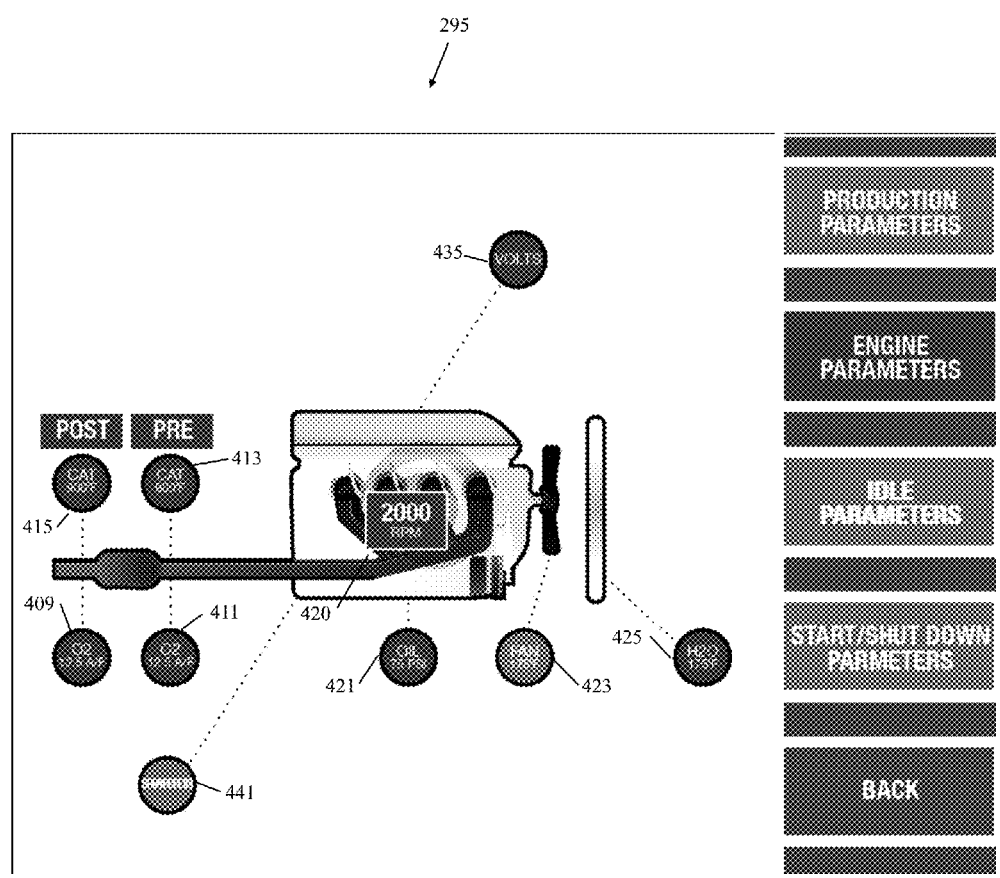
FIG. 14 is a screenshot showing an engine data page for display by a programmable controller for a combustion engine.

An exemplary engine data page 295 is shown in FIG. 14. The engine data page 295 shows the current engine status, and it includes the following real-time sensor data and color indicators showing whether the sensor data displayed is within a desired operating range: the pre- and post-catalytic converter exhaust $O_2$ levels 409, 411; the pre- and post-catalytic converter exhaust temperatures 413, 415; the engine starter status 441; the engine RPM 420; the engine oil pressure 421; the engine fan status 423; the engine water temperature 425; and the system voltage 435. For certain of the sensor data displayed, it is also desirable to include a third color indicator to visually show when the sensor data has passed a predetermined warning limit, this warning limit being outside of the desired operating range. The sensors for which it may be desirable to have this third color indicator include all engine exhaust sensors, the engine oil pressure, the engine water temperature, and the system voltage.

The settings page associated with the engine may be a single page or the settings options may be divided across several pages. The settings options associated with the engine include production parameters, engine parameters, engine idle parameters, and startup and shutdown parameters. The production parameters may include the minimum exhaust temperatures pre- and post-catalytic converter during operation, along with a minimum operating engine temperature and the desired operating RPM for the internal combustion engine. The engine parameters may include a maximum difference between the pre- and post-catalytic converter $O_2$ levels, the minimum oil pressure, the engine temperature at which the fan is actuated on, the minimum RPM for a standard shutdown procedure, the engine temperature warning level, and an $O_2$ control loop setpoint. The idle parameters may include an idle mode threshold, an idle mode duration timer, and an idle mode RPM for the internal combustion engine. The startup and shutdown parameters may include an engine stop delay timer, a set number of attempts for an automatic restart, a time delay between a shutdown and a restart, the LEL shutdown level, and a LEL delay timer to set the restart time delay after an LEL shutdown event.

Figure 15:
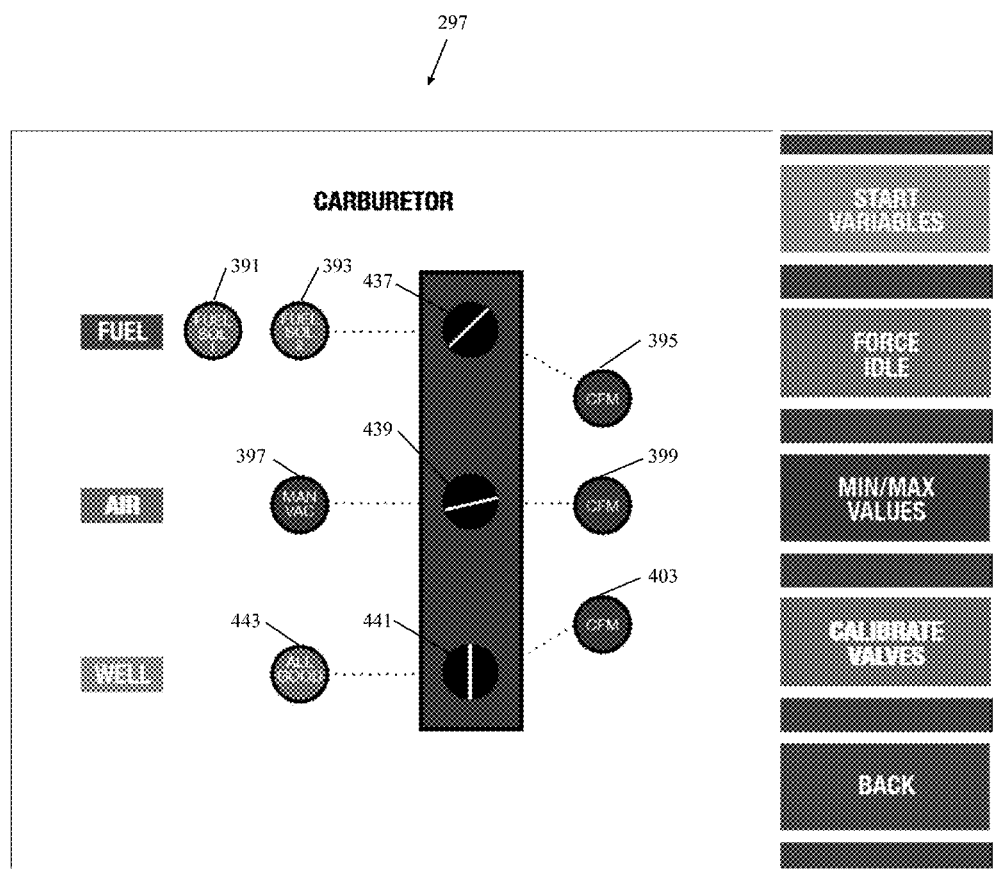
FIG. 15 is a screenshot showing a carburetor data page for display by a programmable controller for a combustion engine.

An exemplary carburetor data page 297 is shown in FIG. 15. The carburetor data page 297 shows the current positions of the three intake valves 437, 439, 441 as well as the current carburetor status. The carburetor data page 297 includes the following real-time sensor data and color indicators showing whether the sensor data displayed is within a desired operating range: the status of the first fuel solenoid 391 (off or on); the status of the second fuel solenoid 393 (off or on); the fuel flow rate 395; the external air manifold vacuum 397; the external air flow rate 399; the volatile vapor flow rate 401 from the well; and a general status indicator for the well 443 showing if the well is in a "good" condition or if sensor data associated with the well is out of range. For certain of the sensor data displayed, it is also desirable to include a third color indicator to visually show when the sensor data has passed a predetermined warning limit, this warning limit being outside of the desired operating range. The sensors for which it may be desirable to have this third color indicator on the carburetor data page 297 include the flow rate of the fuel, external air, and volatile vapors and the external air manifold vacuum pressure.

The settings page associated with the carburetor may be a single page or the settings options may be divided across several pages. The settings options associated with the carburetor include start variable settings and maximum/minimum valve settings. In addition, the carburetor page 297 may link the force idle page, discussed above, and a calibration page for the intake valves. The start variable settings page may include initial settings for the fuel intake valve and the air intake valve at startup of the internal combustion engine. These initial valve settings may be expressed as a percentage open, with 0% being fully closed and 100% being fully open. The maximum/minimum valve settings page enables the operator to set the minimum and maximum valve opening parameters for each of the fuel intake valve, the external air intake valve, and the volatile vapor intake valve.

On the valve calibration page, the operator may manually actuate any of the intake valves to a designated opening, again expressed as a percentage open, and the programmable controller displays both the sensor data from the valve sensor associated with the manually actuated valve, as a percentage open, and the voltage applied to the valve to achieve the manually entered parameter. The operator may then compare the valve operation with known technical specifications for the valve to determine if the valve is in need of cleaning or being replaced. In alternative embodiments, the same procedure may be performed on other valves or solenoids incorporated into the system.

Figure 16:
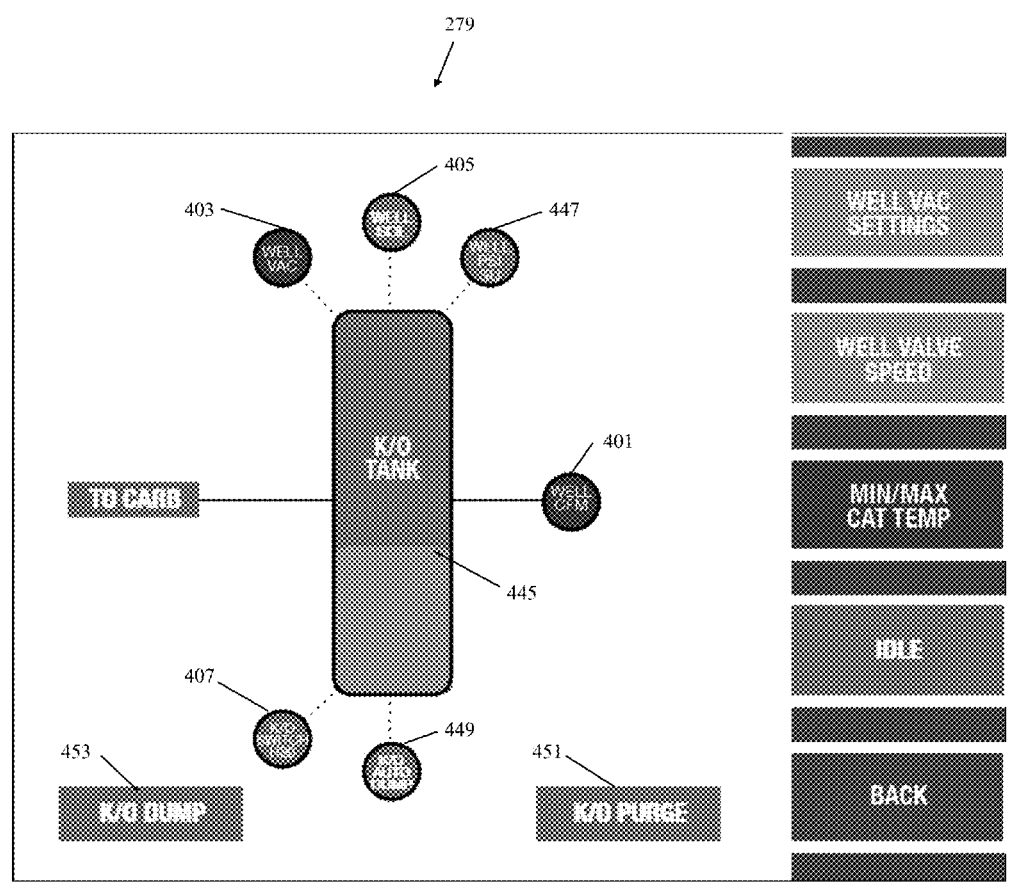
FIG. 16 is a screenshot showing a well data page for display by a programmable controller for a combustion engine.

An exemplary well data page 279 is shown in FIG. 16. The well data page 279 includes the following real-time sensor data and color indicators showing whether the sensor data displayed is within a desired operating range: the volatile vapor flow rate 401 from the well; the well vacuum 403; the KO tank purge valve status 405; the KO tank water drain valve status 407; the well intake sensor 445; the well purge sensor 447; and the well water drain sensor 449. The well data page 299 also includes graphical buttons 451, 453 as active regions for the operator to actuate the KO tank purge valve and the tank water drain valve.

From the well data page 279, the operator may navigate to the well vacuum settings page 285, the well valve settings page 287, the catalytic converter temperature settings page 289, and to the force idle page 291. On the well vacuum settings page 285, the minimum and maximum well vacuum parameters may be set by the operator. On the well valve settings page, the operator may adjust the gain/time for opening up the well intake valve following startup of the internal combustion engine. On the catalytic converter temperature settings page 289, the operator may set the pre- and post-catalytic converter exhaust temperature warning parameter and the well lean temperature parameter.

Although not depicted, the general settings page 293 is a page on which the operator may enter general settings and parameters for the system. These parameters may include the job number, the unit number, and the serial number for the internal combustion engine. The input/output status page 301 shows the current condition of all the digital inputs, digital outputs, and analog inputs for the programmable controller, along with the real-time sensor data associated with each input. The override page 303 enables the operator to override any of the digital inputs, digital outputs, and analog inputs for the programmable controller. Manually overriding one of the inputs or outputs can be helpful for troubleshooting a bad wire, sensor, solenoid, and switch. In certain embodiments, the override page 303 is only available to an operator who is a tech level 2.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for combusting volatile vapors, the system comprising:
a carburetor having a first intake valve for receiving fuel from a fuel source, a second intake valve for receiving external air from an external air intake, and a third intake valve for receiving volatile vapors from a vapor source, the carburetor configured to discharge a combustion mixture;
a combustion engine operatively coupled to the carburetor to receive the combustion mixture into a combustion chamber;
a plurality of sensors configured to generate sensor data based on a respective plurality of physical properties, wherein the plurality of sensors includes a first valve sensor operatively coupled to the first intake valve, a second valve sensor operatively coupled to the second intake valve, and a third valve sensor operatively coupled to the third intake valve, each of the valve sensors being configured to sense a valve position as one of the physical properties;
the sensors including one or more vapor pressure sensors, each of the one or more vapor pressure sensors operable to sense a vapor source pressure or vacuum as one of the physical properties;
a programmable controller configured to receive the sensor data as input from each of the plurality of sensors and to control the intake valves to regulate respective ratios of the fuel, the external air, and the volatile vapors taken in through the carburetor in response to the received sensor data; and
a display operatively coupled to the programmable controller, wherein the programmable controller is configured to display at least a real-time portion of the sensor data on the display as the sensor data is received, the real-time portion of the sensor data including each of the valve positions;
wherein the programmable controller is further configured to modify the valve positions of each of the intake valves based on the sensed vapor source pressure or vacuum and within a range of minimum to maximum valve opening settings for each intake valve programmed into the programmable controller.

2. The system of claim 1, further comprising a wireless communication module communicably coupled to the programmable controller and configured to enable wireless communication between the programmable controller and a wide area network.

3. The system of claim 2, wherein the programmable controller wirelessly communicates with the display.

4. The system of claim 2, further comprising a remote programmable unit configured to communicate with the programmable controller via the wide area network.

5. The system of claim 1, wherein the programmable controller is further configured to color code individual parts of the real-time portion of the sensor data on the display in accordance with a comparison of each individual part with one of a predefined value or a predefined range.

6. The system of claim 1, wherein the programmable controller is further configured to receive control data and actuate one or more of the intake valves to a position defined by the control data in response to receiving the control data.

7. The system of claim 1, wherein the programmable controller is further configured to receive control data which establishes a predetermined limit for sensor data received from one of the plurality of sensors.

8. The system of claim 7, wherein the programmable controller is further configured to take a predetermined action when the predetermined limit is reached by the sensor data received from one of the plurality of sensors.

9. The system of claim 7, wherein the programmable controller is further configured to communicate an alert to at least one of the display and a remote unit when the predetermined limit is reached by the sensor data received from one of the plurality of sensors.

10. The system of claim 1, wherein the programmable controller is further configured to display historical sensor data on the display for a predetermined time period prior to the sensor data being received.

11. The system of claim 1, wherein the programmable controller is further configured to monitor a voltage applied to one of the intake valves and to display the monitored voltage on the display concurrently with the sensor data from the one of the intake valves.

12. The system of claim 1, wherein the programmable controller is further configured to monitor a maintenance schedule for the combustion engine.

13. The system of claim 12, wherein the maintenance schedule includes separate scheduling for maintenance of a plurality of subsystems of the combustion engine.

14. The system of claim 1, wherein the plurality of sensors further includes one or more of:
an exhaust sensor configured to sense a chemical component in an exhaust from the combustion engine as one of the physical properties;
a rotation rate meter configured to sense the revolutions per minute (RPM) of the combustion engine as one of the physical properties;
a vapor flow meter operatively coupled between the carburetor and the vapor source and configured to sense a flow rate of the volatile vapors flowing to the carburetor from the vapor source as one of the physical properties;
a fuel flow meter operatively coupled between the carburetor and the fuel source and configured to sense a flow rate of the volatile vapors flowing to the carburetor from the fuel source as one of the physical properties;

an oxygen sensor operatively coupled between the carburetor and the external air intake and configured to sense oxygen levels in the external air flowing into the carburetor from the external air intake as one of the physical properties;

one or more temperature sensors, each of the one or more temperature sensors positioned to sense an operating temperature of the combustion engine as one of the physical properties; and one or more pressure sensors, each of the one or more pressure sensors being positioned to sense one of an engine oil pressure as one of the physical properties.

15. A system for combusting volatile vapors, the system comprising:

a carburetor having a plurality of intake valves for receiving fuel from a fuel source, external air from an external air intake, and volatile vapors from a vapor source, the carburetor configured to discharge a combustion mixture into a combustion chamber of a combustion engine;

a plurality of sensors configured to generate sensor data based on a respective plurality of physical properties, wherein the plurality of sensors includes a plurality of valve sensors, each valve sensor operatively coupled to one of the intake valves and configured to sense a valve position as one of the physical properties;

the sensors including one or more vapor pressure sensors, each of the one or more vapor pressure sensors operable to sense a vapor source pressure or vacuum as one of the physical properties;

a programmable controller configured to receive the sensor data as input from each of the plurality of sensors and to control the intake valves to regulate respective ratios of the fuel, the external air, and the volatile vapors taken in through the carburetor and into the combustion engine in response to the received sensor data; and a display operatively coupled to the programmable controller, wherein the programmable controller is configured to display at least a real-time portion of the sensor data on the display as the sensor data is received;

wherein the programmable controller is further configured to modify the valve positions of each of the intake valves based on the sensed vapor source pressure or vacuum and within a range of minimum to maximum valve opening settings for each intake valve programmed into the programmable controller.

16. The system of claim 15, wherein the plurality of intake valves includes a first intake valve configured to control flow of the fuel and a second intake valve configured to control flow of the external air and the volatile vapors, and the plurality of sensors includes a first valve sensor operatively coupled to the first intake valve and a second valve sensor operatively coupled to the second intake valve, each of the valve sensors being configured to sense a valve position as one of the physical properties.

17. The system of claim 15, wherein the plurality of intake valves includes a first intake valve configured to control flow of the fuel, a second intake valve configured to control flow of the external air, and a third intake valve configured to control flow of the volatile vapors, and the plurality of sensors includes a first valve sensor operatively coupled to the first intake valve, a second valve sensor operatively coupled to the second intake valve, and a third valve sensor operatively coupled to the third intake valve, each of the valve sensors being configured to sense a valve position as one of the physical properties.

18. The system of claim 15, further comprising a wireless communication module communicably coupled to the programmable controller and configured to enable wireless communication between the programmable controller and a wide area network.

19. The system of claim 18, wherein the programmable controller wirelessly communicates with the display.

20. The system of claim 18, further comprising a remote programmable unit configured to communicate with the programmable controller via the wide area network.

* * * * *